Nov. 18, 1969 P. E. LANDSEM 3,478,984
LINE REELING CONTROL MEANS
Filed Sept. 19, 1967 3 Sheets-Sheet 1
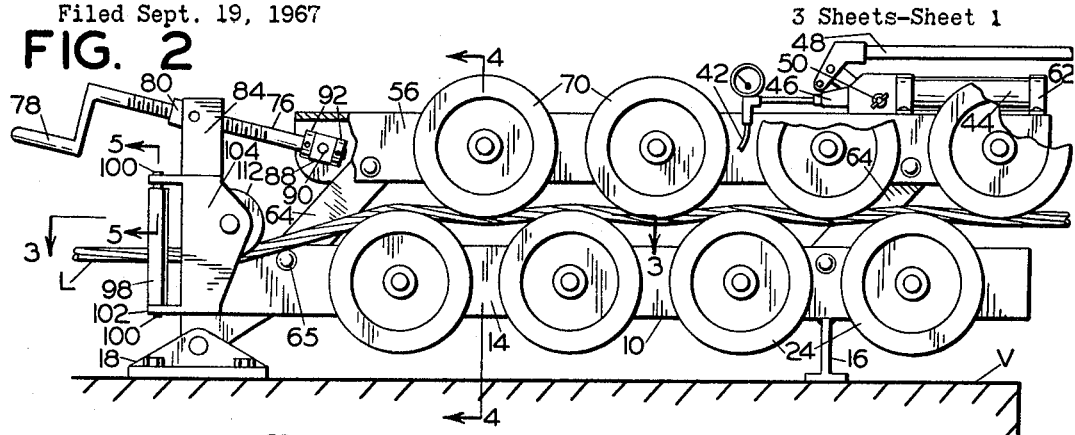
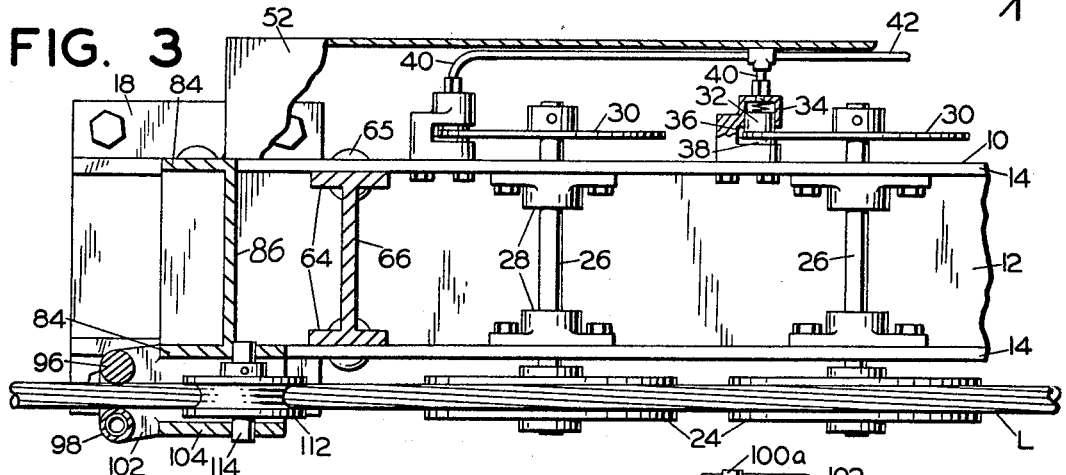
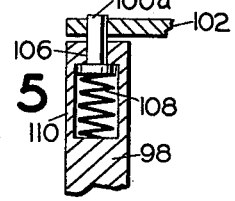
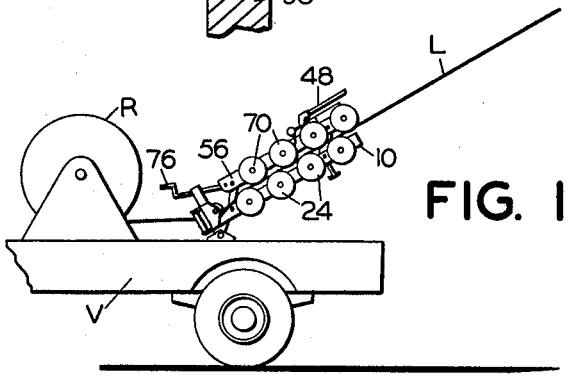
INVENTOR.
PERRY E. LANDSEM
BY Eugene M. Echelman
ATTORNEY Nov. 18, 1969    P. E. LANDSEM    3,478,984
LINE REELING CONTROL MEANS
Filed Sept. 19, 1967    3 Sheets-Sheet 2
FIG. 6
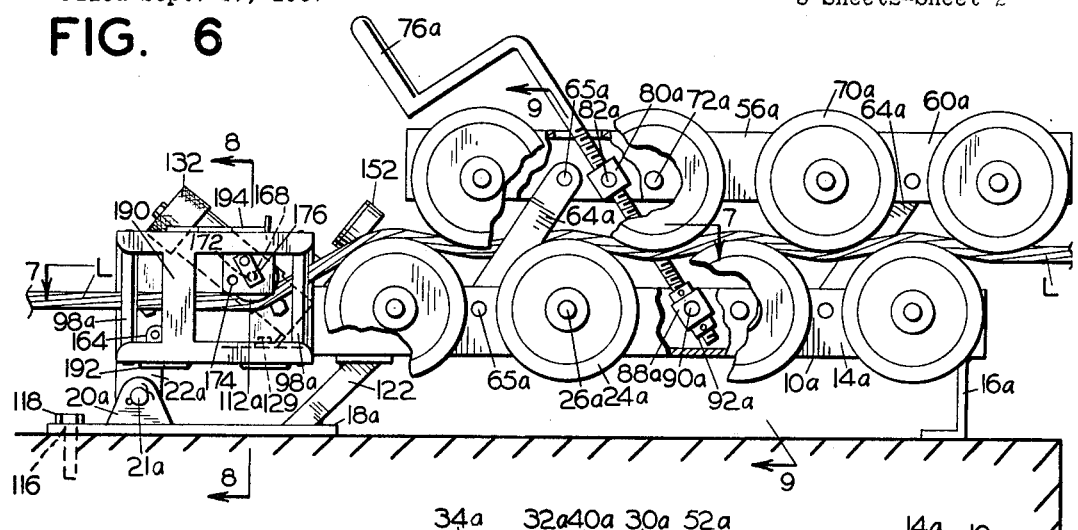
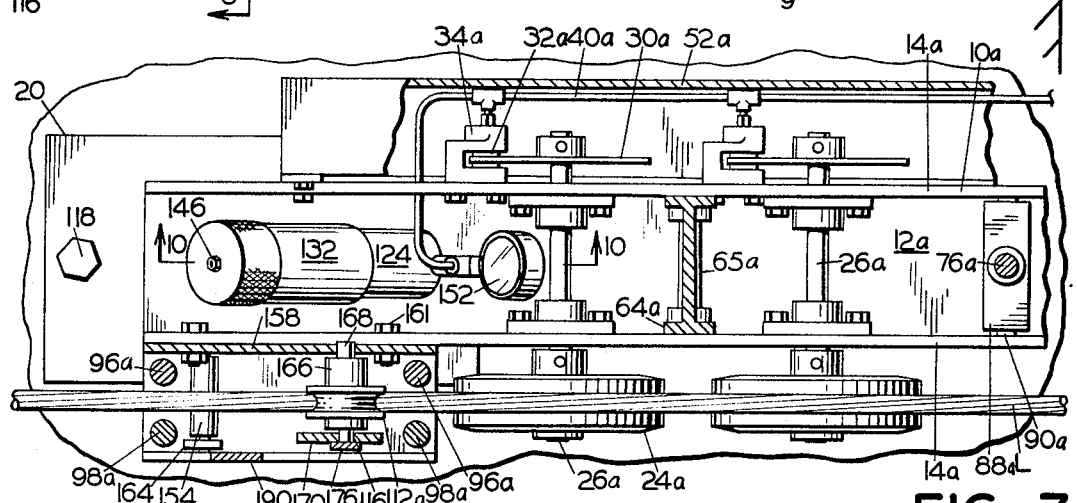
FIG. 7
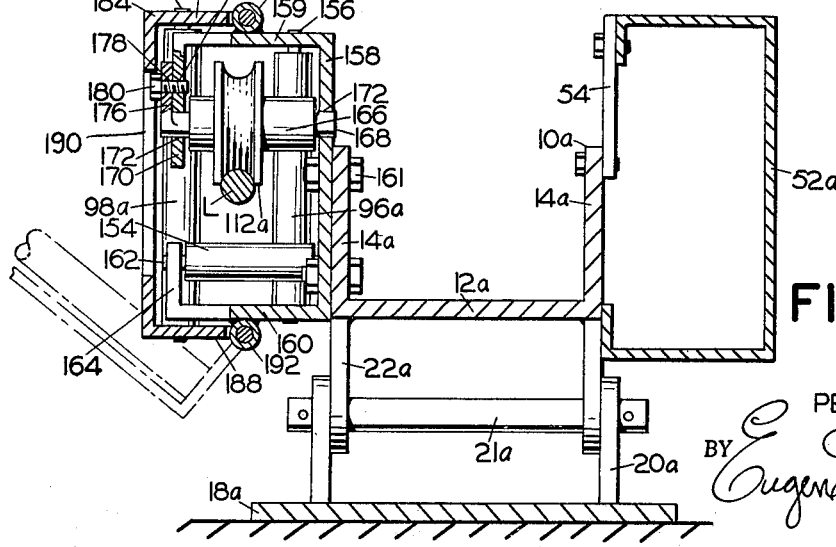
FIG. 8
INVENTOR.
PERRY E. LANDSEM
BY Eugene M. Eckelman
ATTORNEY Nov. 18, 1969     P. E. LANDSEM     3,478,984

LINE REELING CONTROL MEANS

Filed Sept. 19, 1967     3 Sheets-Sheet 3

INVENTOR.
PERRY E. LANDSEM
BY Eugene M. Eckelman
ATTORNEY

United States Patent Office 3,478,984
Patented Nov. 18, 1969

3,478,984
LINE REELING CONTROL MEANS
Perry E. Landsem, 4525 S.E. River Drive,
Milwaukie, Oreg. 97222
Continuation-in-part of application Ser. No. 424,258,
Feb. 12, 1965. This application Sept. 19, 1967, Ser.
No. 677,819
Int. Cl. B65h 59/12
U.S. Cl. 242—154        10 Claims

ABSTRACT OF THE DISCLOSURE

The line reeling control means has a base member on which is rotatably supported a plurality of lower friction sheaves. A carrier frame is pivotally supported on the base member by pivotal links and this frame carries a plurality of upper braking sheaves aligned edgewise with the lower sheaves but longitudinally offset therefrom. The carrier frame is movable longitudinally and arcuately by its link connection with the base, such movement being accomplished by screw drive means. The sheaves receive their braking function by disc brake means connected thereto and operated by hand pressure means. Line is directed into the friction sheaves by a fairlead mechanism connected to the base member. The base member has a mounting bracket therefor which allows it to pivot on a horizontal axis as well as on a vertical axis.

---

This application is a continuation-in-part of application Ser. No. 424,258, filed Feb. 12, 1965, now abandoned, by Perry E. Landsem for Line Reeling Control Means.

The present line reeling control means is particularly applicable in combination with apparatus for the stringing of heavy lines on poles such as electric or telephone lines. It is customary in the stringing of heavy lines of the type described to attach pulleys to the cross-arm of the poles upon which the line is being installed and reeve the line loosely therethrough. The line is fed from a reel at the stringing end and is connected to a pulling device at the other end. In order to keep the line from sagging into the street or into lower lines as it is being installed, the line must be kept under tension which has heretofore required heavy duty, expensive mechanism.

A primary objective of the present invention is to provide improvements in line reeling control means wherein the structure is more simplified and operates more positively in reeling and braking functions than existing structures.

Another object is to provide line reeling control means which is operative on a line independently of a supply reel, and to provide a structure of the type described which is conveniently operable by a single workman.

Another object is to provide a line reeling control means having a novel arrangement of friction means to provide a positive and controlled movement of line therethrough and furthermore to provide novel braking means for such controlled movement of the line.

Still another object is to provide line reeling control means having novel attachment means therefor permitting pivotal adjustment of the control means both on a horizontal axis and on a vertical axis whereby such control means can direct itself precisely in the direction that the line is being strung.

Still another object is to provide a novel fairlead structure for efficiently directing line from a reel to friction braking sheaves.

The invention will be better understood and additional objects thereof will become more apparent from the accompanying specification and claims considered together with the accompanying drawings, wherein like numerals of reference indicate like parts.

Figure 10:
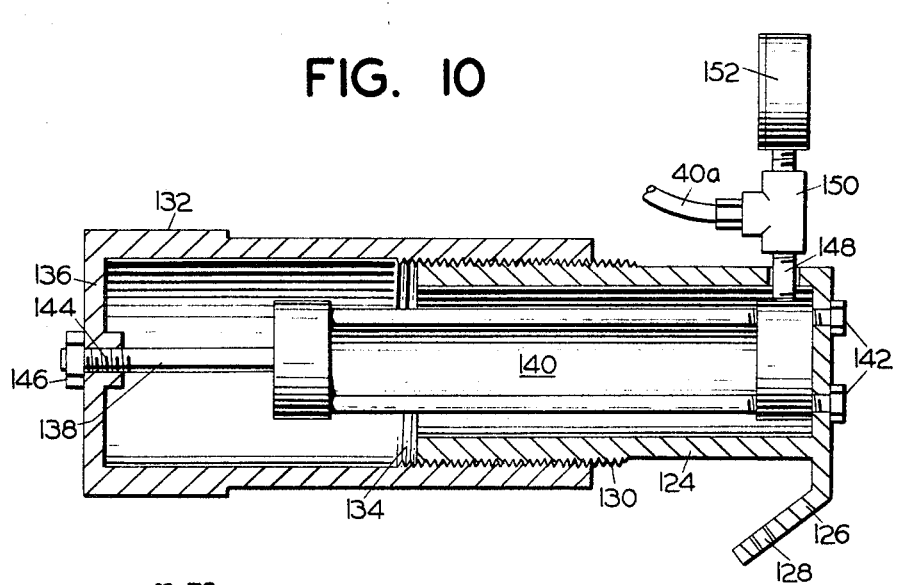
Figure 9:
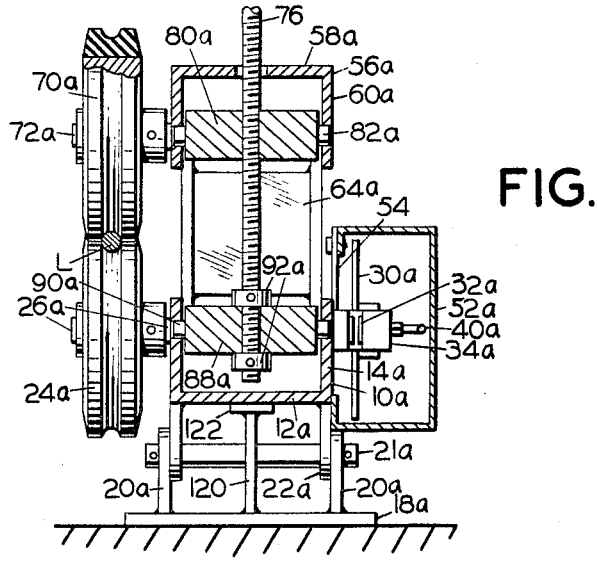

In the drawings:
FIGURE 1 is an elevational view of a first form of the present line reeling control means, said control means being shown mounted on a vehicle;
FIGURE 2 is a side elevational detailed view of the control means of FIGURE 1 with parts of said view being broken away;
FIGURE 3 is an enlarged fragmentary sectional view taken on the line 3—3 of FIGURE 2;
FIGURE 4 is an enlarged fragmentary sectional view taken on the line 4—4 of FIGURE 2;
FIGURE 5 is an enlarged fragmentary sectional view taken on the line 5—5 of FIGURE 2;
FIGURE 6 is a side elevational view of a second form of the present control means with parts thereof broken away;
FIGURE 7 is an enlarged fragmentary sectional view taken on the line 7—7 of FIGURE 6;
FIGURE 8 is an enlarged sectional view taken on the line 8—8 of FIGURE 6;
FIGURE 9 is an enlarged sectional view taken on the line 9—9 of FIGURE 6; and
FIGURE 10 is an enlarged sectional view taken on the line 10—10 of FIGURE 7.

Referring now particularly to FIGURES 1–5, which show a first form of the present line reeling control means, there is provided a U-shaped base 10 having a bottom wall 12 and side walls 14. The base is adapted to be supported on the bed of a vehicle or the like at its front end by an integral foot member 16, FIGURE 2, secured to the under surface, and preferably said base member is adapted to be pivotally secured or anchored to the vehicle bed at its other end. This pivotal mounting is accomplished by a support bracket 18 adapted to be secured to the vehicle and having a pair of upwardly projecting ears 20 pivotally attached by means of pins 21 to a pair of downwardly projecting ears 22 integrated with the bottom of the base 10. By means of this pivotal but secured connection to the vehicle, the device can pivot to any position required when it is operating in line reeving or line holding functions and can serve as an anchor for the line since it is secured to the truck. Such functioning and positioning of the present device is illustrated in FIGURE 1.

Base member 10 supports a plurality of friction sheaves 24 on one side thereof. As best seen in FIGURES 3 and 4, these sheaves are mounted on cross shafts 26 journaled in bearings 28 secured to the inner surfaces of the base walls 14. Sheaves 24 are keyed or otherwise secured on the shafts 26 for rotation therewith.

The ends of the shafts 26 opposite from the sheaves 24 project through the far wall 14 of the base and have a brake disc 30 secured fixedly thereto. Each of the brake discs 30 is associated with a fluid operated plunger 32 slidable in a cylinder or housing 34 and projecting at one of its ends from the housing for surface engagement with the discs 30. Each of the housings 34 is recessed at 36 for receiving its respective disc 30, the disc engaging end of the plunger 32 projecting into said recess for engaging the disc. Recess 36 has a plate 38 on its side surface opposite from the plunger 32 to form a backing plate for the disc when the plunger 32 forcefully engages said disc.

Pressured fluid is adapted to be admitted to the several cylinders 34 by hoses 40 leading from each of the housings and joined to a common hose 42 leading to a hand operated pressure pump 44, FIGURE 2. This pump is of conventional construction, having a suitable internal plunger, not shown, operating in a cylinder, an outlet end 46, and a pivotal handle 48 which when reciprocated pivotally causes the plunger to build up pressure in the line 42. Pump 44 has a release valve 50 which may be opened when desired to release the pressure in the pump and in the line 42. It is apparent that upon pivotal reciprocation of the handle 48 of the pump, the brake plungers 32 are forced against the discs 30 and apply a braking force thereto. The disc portion 30 of the braking structure as well as the plunger mechanisms 32 are concealed in a bottomless auxiliary side housing 52 secured as by welding to the base 10.

Supported on the base 10 is a carrier frame 56. This carrier frame is of inverted U-shape, FIGURE 4, and has a top wall 58 and side walls 60. The pump 44 is secured to the carrier frame 56 such as by suitable strap means 62. Carrier frame 56 is supported on the base by upstanding pairs of links 64. These links are pivotally connected at their opposite ends to the base and to the carrier frame by pivot pins 65 and hold the carrier frame in upwardly spaced, parallel relation to the base. Each of the pairs of end links are interconnected integrally by a cross plate 66 to stabilize the pivoted support of the carrier on the base. Since the carrier frame is supported on upstanding pivoted links, the carrier when moved longitudinally travels in an arcuate path.

Carrier 56 supports a plurality of friction sheaves 70 on cross shafts 72 journaled in bearings 74 secured to the side walls of the carrier. Friction sheaves 70 are disposed in vertical edge alignment with the sheaves 24 but are offset longitudinally from the latter sheaves as seen in FIGURE 2.

Friction sheaves 24 and 70 have peripheral edge grooves 75, FIGURE 4, and this grooved portion of the sheaves is lined or otherwise has a friction surface, such as of rubber, so that when a power line L or the like is reeved therethrough, as shown in FIGURE 2, a frictional grip can be obtained on the line by lowering the carrier sufficiently to crimp the line between the upper and lower sheaves. This crimped condition of the line provides a controlled movement of the latter through the apparatus. That is, when the line is only slightly crimped between the upper and lower sheaves, movement thereof through the apparatus can be restrained somewhat by braking the sheaves through means of the friction discs 30, and such movement is completely controlled even up to a fully braked or stopped position by selected lowered positioning of the carrier frame and a fully applied condition of the brakes.

Longitudinal positioning of the carrier is accomplished by a screw crank 76 having a crank handle 78. The crank 76 has threaded engagement with a nut or block 80 having stub shafts 82 pivotally supported in a pair of upright arms 84, FIGURES 2 and 3, integrated with the base at its forward end, the said arms being interconnected by a cross plate 86 to provide a rigid pulling or pushing frame for operating the carrier frame.

The end of the crank 76 opposite from the handle is unthreaded and passes freely through a suitable bore in a block 88 pivotally supported between the side walls 60 of the carrier 56 by stub shafts 90. Collars 92 are secured to the screw 76 on opposite sides of the block 88 to provide a push-pull connection between the carrier and the crank.

By means of the structure just described, rotation of the screw causes said screw to move axially relative to the block 80 which of course operates to move the carrier 56 in its longitudinal arcuate path.

Fairlead means are provided at the rearward end of the present device for guiding the line between the upper and lower sheaves. Such fairlead means comprises a pair of transversely spaced vertical rollers 96 and 98, FIGURE 3. These rollers have end shafts 100 engaged in suitable bores in rearwardly extending ears 102 on one of the arms 84 and an auxiliary vertical arm 104 integrated with the ears.

It is desirable that one of the rollers 96, 98 be removable from its connection with the ears 102, and for this purpose the upper end shaft 100a of the roller 98, FIGURE 5, is slidably mounted in an end bore 106 of the roller 98 and is urged upwardly in a roller mounting position by a spring 108 disposed in a hollow portion 110 of the shaft. By means of this structure the roller can be detached from the supporting ears 102 by depressing the shaft portion 100a downwardly to disengage it from the upper ear 102. Removal of the roller 98 is desirable when it is required that a wide portion of the line, such as a splice moves through the apparatus.

A roller 112 is mounted horizontally between the arm 104 and adjacent arm 84 by means of a shaft 114, this roller being longitudinally aligned with the rollers 24, 70. In a preferred construction the bottom of roller 112 is lower than the top of sheaves 24 whereby line L is directed upwardly somewhat from the bottom edge of the roller 112 to the first friction sheave 24.

In the operation of the present device, it is mounted in a suitable place such as on the bed of a vehicle V as shown in FIGURE 1. It is pivotally secured to the vehicle bed by means of the support bracket 18 and is associated with a reel R carried on the vehicle. To thread the end of a line L through the device the carrier frame 56 is first drawn rearwardly by the crank 76 to elevate it above the base 10 sufficiently to permit free threading of the line between the sheaves 24 and 70, the line first being threaded through the vertical rollers 96, 98 and under roller 112. Thereupon, the line may be pulled out freely in stringing it from pole to pole. The carrier is moved forwardly to provide somewhat of a crimp in the line or at least a gripping engagement when the brakes are applied. Of course the line can run substantially freely through the device even though it is crimped somewhat if the brakes are not applied, or also it could slide through the sheaves if there is little or no crimp even though the brakes are applied. But preferably, the carrier is positioned such that the line has a non-sliding engagement with the friction sheaves and the movement of said line is controlled by the brakes. That is, assuming that the relative position of the carrier 56 and base 10 is such that the line will not slide through the sheaves except when the latter are capable of rotating, it is apparent that the operator can control precisely the outflow of line L from the reel, or complete stoppage thereof, by operation of the pump 44. Release of the braking force is accomplished by hand operation of release valve 50. The brake pump preferably is mounted on the rear portion of the carrier and on top thereof as shown for ready access to the operator.

FIGURES 6–10 show a second embodiment of the line reeling control means. This embodiment, similar to the first embodiment, has a U-shaped base 10a, FIGURES 6–9, having a bottom wall 12a and side walls 14a. This base also has a front foot member 16a, FIGURE 6, and a rear support bracket 18a, FIGURES 6, 8 and 9. A pivotal attachment of the base to the bracket 18a on a horizontal axis is provided by a pair of upwardly projecting ears 20a on the bracket pivotally attached to a pair of downwardly projecting ears 22a on the base 10a by a shaft 21a. In this embodiment, support bracket 18a has a single vertical aperture 116, FIGURE 6, adjacent to the rearward portion thereof for receiving a pivot attaching screw 118. Aperture 116 is disposed centrally between the sides of the support bracket, as seen in FIGURE 7, and the connection with the vehicle is arranged to permit a swinging movement of the line reeling control means from side to side, or in other words a swinging movement on a vertical axis. It is thus apparent that not only is the device adjustable vertically on the axis 21a but it is also adjustable from side to side on the axis 118. To string line, the device need be located only in approximate alignment with the direction in which the line is to be strung since such device can adjust itself in the two directions. Support brackets 18a has a forwardly disposed outrigger arm 120 which is inclined forwardly and which has a top plate 122 forming a seat for the base 10a. Outrigger arm 120 and foot member 16a provide support for the base 10a in a lowered position thereof. The outrigger arm 120 may, however, provide full support for the base in those positions where the foot member 16a does not have engagement with a vehicle bed, such as in a side turned position.

Base member 10a has a plurality of friction sheaves 24a, FIGURES 6, 7 and 9, secured on cross-shafts 26a, and the ends of the shafts 26a opposite from the sheaves 24a project through the far wall 14a of the base and have brake discs 30a secured thereto, FIGURES 7 and 9. Each of the shafts 26a has a brake disc 30a secured thereto and each of such discs is associated with a fluid operated plunger 32a slidable in a cylinder or housing 34a secured to a wall 14a of the base. Pressured fluid is admitted to the cylinder 34a by a common hose or conduit 40a which in the embodiment of FIGURE 6 is connected to a novel pressure applying device or pump, now to be described.

Such pressure applying device, seen in FIGURES 6, 7 and 10, comprises a tubular housing 124 secured to the bottom wall 12a of the base 10a. For securing the housing 124 to the base 10a the said housing has an integral angled bracket 126 having one or more apertures 128 to receive screws 129 threadedly engaging the said base. As best seen in FIGURES 6 and 7, the housing 124 is secured to the base 10a intermediate the ends of the latter, and assumes a forwardly angled disposition. The housing has external screw threads 130 at the upper portion thereof and a tubular cap 132 having internal threads 134 is threadedly mounted on said housing. Cap 132 has a top wall 136 with an aperture for receiving the free end of a piston rod 138. The piston rod 138 works in a fluid cylinder 140 disposed interiorly of the housing 124. The cylinder is secured to the base 10a by stud screws 142 and encloses the usual plunger, not shown, secured to the inner end of the piston rod 138. Rod 138 has a threaded outer end 144 secured to the top wall 136 of the cap 132 by lock nuts 146, whereby the plunger in the cylinder is movable by rotative operation of the cap 132 on the housing 124. The lower end of cylinder 140 has an outlet conduit 148 connected to the air hose 40a by a T-connection 150 to which is also connected a pressure gauge 152.

Upon rotative operation of the cap 132 on the housing 124 in the proper direction pressure is applied to the line 40a to operate the plungers 32a. Such operation is accomplished manually, and depending upon the rotative positioning of the cap on the housing a selected braking force is applied to the discs 30a. Thus, a complete braking or stop condition can be applied to the discs 30a or an intermediate condition can be applied thereto wherein the discs 30a are rotatable but restricted in such rotation. The disc portion of the braking structure is concealed by a side housing 52a secured suitably to one wall 14a of the base as by straps 154, FIGURES 8 and 9.

As an important feature of the braking mechanism, threads 130 and 134 are closely spaced, or in other words they have a fine pitch, and the threaded engagement between the housing and cap includes a substantial number of threads. Such a threaded connection permits a fine adjustment of pressure on the system and in addition such provides considerable friction between the two parts so that the cap 132 turns hard on the threads. The difficulty of rotating the cap, as a result of the excessive friction, serves to limit the pressure which can be manually applied to the system, thus insuring that over-pressure will not result.

Supported on the base 10a is a carrier frame 56a which similar to FIGURE 1 is of inverted U-shape in cross-section, having a top wall 58a and side walls 60a, FIGURES 6 and 9. The carrier frame is supported on the base by upstanding pairs of links 64a, FIGURES 6 and 7, and has pivotal connection thereto by pivot pins or shafts 65a. Carrier frame 56a supports a plurality of friction sheaves 70a on cross-shafts 72a, FIGURES 6 and 9. These friction sheaves are in vertical edge alignment with the sheaves 24a but are offset longitudinally so that a friction grip can be obtained on a line by lowering the carrier 56a to crimp the line between the upper and lower sheaves.

Longitudinal positioning of the carrier 56a is accomplished by a screw crank 76a as in FIGURE 1, but in the FIGURE 6 embodiment the screw crank is disposed forwardly of the one end. The crank 76a has threaded engagement in a nut or block 80a, FIGURES 6 and 9, pivotally secured between the walls 60a of the carrier frame, as by means of stub shafts 82a. The lower end of the crank 76a passes freely through a bore in a nut or block 88a pivotally supported between the side walls 14a of the base, as by means of stub shafts 90a. Collars 92 are secured to the crank 76a on opposite sides of the block 88a to provide the push-pull connection of the carrier with the base.

As in the FIGURE 1 embodiment, the embodiment of FIGURE 6 has fairlead means, FIGURES 6, 7 and 8, for directing the line L into the friction sheaves. The fairlead means of this latter embodiment comprises a pair of inwardly disposed longitudinally spaced vertical rollers 96a, a pair of outwardly disposed, longitudinally spaced vertical rollers 98a, a bottom horizontal roller 154, and a rear, upper sheave 112a. Rollers 96a have end stub shafts 156 journaled in a channel shaped housing 158 having a top wall 159 and a bottom wall 160. The housing is connected to the base by bolts 161 and has its open portion directed laterally outwardly from the base. Bottom roller 154 has end stub shafts 162 one of which is journaled in the upstanding wall of housing 158 and the other of which is journaled in an upturned ear 164 on the bottom wall 160.

Upper sheave 112a is integrated with a tubular bearing 166 slidably receiving a shaft 168 journaled at one end in the upstanding wall of housing 158 and at the other end in a down turned ear 170 on the upper wall 159 of the housing 158. The housing and ear 170 have two sets of horizontally spaced apertures 172 and 174, FIGURE 6, for supporting the sheave 112a at different distances from the first friction sheave 24a to vary the angle at which the line L is directed onto the said first friction sheave 24a. Such angle is determined by the positioning of the shaft 168 in one or the other of the apertures 172 or 174. The positioning of the sheave 112a in its two locations is determined by the size of the line to be fed through the reel. If small line is to be fed, the shaft 168 for the sheave is mounted in the set of holes 172, and if a larger line is to be fed the shaft 168 is mounted in the set of holes 174 so as to decrease the angle of bend of the line between the sheaves 112a and the first friction sheave 24a.

The outer end of shaft 168 has a right angle arm 176, FIGURES 6 and 8, which extends along the outer side of down turned ear 170, and this arm has an aperture 178, FIGURE 8, for freely receiving a screw 180 adapted for threaded engagement with a tapped bore 182 in the ear 170. Bore 182 is disposed between and above the apertures 172 and 174 and is arranged to receive the screw 180 in either position of the shaft 168. The purpose of the arm 176 and screw 180 is to secure the shaft 168 in place, such shaft being movable from one aperture to the other by removing the screw and pulling the shaft out of its journaled support and also out of bearing 166.

The outer open side of the housing 158 is closed by a cover 184 having top and bottom angled portions 186 and 188, respectively, connected by a front strip or wall 190. The bottom angled portion 188 has a hinged connection 192 with the lower wall 160 of the housing 158, and the upper angled portion has a latch connection 194 with the top wall 159 of the housing. The two vertical rollers 98a are supported in the cover 184, and for this purpose these rollers have end stub shafts 196 journaled in the top and bottom walls 186 and 188, respectively, thereof. With the release of the latch 194, the cover 184 of the fairlead mechanism may be swung downwardly, as shown in phantom lines in FIGURE 8, and since the rollers 98a are carried in the cover, the line L can be moved laterally into engagement with the lower edge of sheave 112a, and does not have to be threaded endwise through the fairlead.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. Line reeling control means comprising a base, a plurality of first sheaves rotatably mounted on said base, a carrier member pivotally mounted on said base for adjustable movement longitudinally and arcuately relative to said base, a plurality of second sheaves rotatably mounted on said carrier member in edge alignment with said first sheaves and adapted to be moved arcuately and longitudinally with said carrier member into longitudinally offset, overlapping relation with the first sheaves for crimping a line reeved between said first and second sheaves to frictionally grip the line, brake means operable on one of said first and second sheaves to control rotation thereof, said other of said first and second sheaves being mounted for independent rotation with relation to the braked sheaves but rotatable therewith in a crimping connection with a line, and means for operating said carrier member in said longitudinal arcuate movement.

2. The line reeling control means of claim 1 including support means attached to said base, and means on said support means providing pivotal adjustment of said base on vertical and horizontal axes.

3. The line reeling control means of claim 1 including support means, means pivotally attaching said base adjacent one of its ends to said support means on a horizontal axis for vertical pivotal adjustment of the base, and means arranged to attach said support means to a supporting surface for horizontal pivotal adjustment movement of the base.

4. The line reeling control means of claim 3 including a support arm engageable between said support means and base for supporting the latter in a substantially horizontal rest position.

5. The line reeling control means of claim 3 wherein said support means is disposed at the rearward end of said base, and including a support arm engageable between said support means and base for supporting the latter in a substantially horizontal rest position, said support arm being disposed forwardly of said horizontal axis pivot means.

6. Line reeling control means comprising a base, a plurality of first sheaves rotatably mounted on said base, a carrier member pivotally mounted on said base for adjustable movement longitudinally and arcuately relative to said base, a plurality of second sheaves rotatably mounted on said carrier member in edge to edge alignment with said first sheaves and adapted to be moved into longitudinally offset overlapping relation with the first sheaves by said carrier member for crimping a line reeved between said first and second sheaves to frictionally grip the line, said first sheaves being freely rotatable with relation to said second sheaves, friction discs integrated with one of said first and second sheaves, fluid operated brake means engageable with said friction discs for controlling rotation thereof, pump means for operating said fluid operated brake means, and means for operating said carrier in said adjustable longitudinal arcuate movement.

7. The line reeling control means of claim 6 wherein said pump means comprises a hand operated pump.

8. The line reeling control means of claim 6 wherein said pump means comprises a fluid operated cylinder having a plunger and projecting piston rod, and manual grip means on said rod for manually operating the latter and said plunger to apply and release said brake means.

9. The line reeling control means of claim 6 wherein said pump means comprises a fluid operated cylinder having a plunger and projecting piston rod, an open-top housing enclosing said cylinder, a cap threadedly mounted on said housing, and means connecting said piston rod to said cap whereby said plunger is operated by rotation of said cap relative to said housing to apply and release said brake means.

10. The line reeling control means of claim 6 wherein said pump means comprises a fluid operated cylinder having a plunger and projecting piston rod, an open-top housing enclosing said cylinder, a cap threadedly mounted on said housing, and means connecting said piston rod to said cap whereby said plunger is operated by rotation of said cap relative to said housing to apply and release said brake means, said threaded engagement between said cap and said housing comprising a substantial number of threads to cause restricted rotation of said cap due to the friction in the threads.

References Cited

UNITED STATES PATENTS

| | | | |
|---|---|---|---|
| 1,833,588 | 11/1931 | Pierce | 242—154 |
| 2,924,328 | 2/1960 | Lidderdale | 226—176 |
| 3,118,635 | 1/1964 | Landsem | 242—154 |

STANLEY N. GILREATH, Primary Examiner

U.S. Cl. X.R.

254—134.3